US009094469B1

United States Patent
Wilder et al.

(10) Patent No.: US 9,094,469 B1
(45) Date of Patent: Jul. 28, 2015

(54) PROFILE GENERATION, USE, AND MANAGEMENT

(75) Inventors: Nicholas Wilder, Boulder, CO (US); Narendra Rocherolle, Tiburon, CA (US); Julie Davidson Rocherolle, Tiburon, CA (US)

(73) Assignee: Eighty-Three Degrees, Inc., Tiburon, CA (US)

( * ) Notice: Subject to any disclaimer, the term of this patent is extended or adjusted under 35 U.S.C. 154(b) by 1357 days.

(21) Appl. No.: 12/011,400

(22) Filed: Jan. 25, 2008

Related U.S. Application Data

(60) Provisional application No. 60/888,073, filed on Feb. 2, 2007.

(51) Int. Cl.
  *G06F 7/04* (2006.01)
  *H04L 29/08* (2006.01)
  *H04L 12/58* (2006.01)

(52) U.S. Cl.
  CPC ............. *H04L 67/306* (2013.01); *H04L 51/32* (2013.01)

(58) Field of Classification Search
  CPC ............................. H04L 67/306; H04L 51/32
  USPC ............... 726/3; 713/168; 380/255; 709/249; 715/751
  See application file for complete search history.

(56) References Cited

U.S. PATENT DOCUMENTS

| | | | |
|---|---|---|---|
| 6,175,831 B1 * | 1/2001 | Weinreich et al. ............ 709/206 |
| 6,820,204 B1 | 11/2004 | Desai et al. | |
| 7,069,308 B2 * | 6/2006 | Abrams ........................ 709/218 |
| 2002/0078007 A1 | 6/2002 | Herrero | |
| 2003/0154116 A1 * | 8/2003 | Lofton .............................. 705/8 |
| 2004/0148275 A1 * | 7/2004 | Achlioptas ........................ 707/3 |
| 2005/0216300 A1 * | 9/2005 | Appelman et al. ................ 705/1 |
| 2005/0216550 A1 * | 9/2005 | Paseman et al. .............. 709/202 |
| 2006/0135264 A1 * | 6/2006 | Shaw et al. ..................... 463/42 |
| 2007/0156522 A1 * | 7/2007 | Carpenter et al. .............. 705/14 |
| 2007/0173325 A1 * | 7/2007 | Shaw et al. ..................... 463/42 |
| 2007/0218900 A1 * | 9/2007 | Abhyanker ................ 455/435.1 |

OTHER PUBLICATIONS

"Migrating Data to Oracle Content Management SDK" Oracle, pp. 1-16, 2002.*

* cited by examiner

*Primary Examiner* — Ali Abyaneh
(74) *Attorney, Agent, or Firm* — North Weber & Baugh LLP

(57) ABSTRACT

Aspects of the present invention relate to systems and methods for generating and personalizing a profile, which may be a user account profile. In embodiments, a profile for a non-authenticated user may be generated, which may be referred to herein as a "phantom profile." In embodiments, the phantom profile provides a means for creating and personalizing user accounts by appending data (which data may comprise content, links and IDs to data on a website or other websites, summaries, photos, one or more unique identifiers, etc.) to a profile, as well as a means for sharing and improving (adding and editing data) these profiles—whether or not the user is an authenticated user of the services associated with the user account.

24 Claims, 11 Drawing Sheets

Jason Surname

Rated: 5 —410

Santa Monica CA
48° - 61° Few Showers

Jason has 28 buddies.

Other ways to get in touch:

Jason's Home Page

Jason's Buddies:

420—— No 30B Buddies yet.

430—— Additional Buddies from Flickr:

Hiding some buddies from Flickr. Show all?

Jason's Web stuff:

Flickr: jason Surname Photos

440
- IMG_5268.jpg  a while ago
- IMG_5267.jpg  a while ago
- IMG_5266.jpg  a while ago
- IMG_5252.jpg  a while ago
- IMG_5248.jpg  a while ago MySpace: Jason

- *none*

FIGURE 4

Shared Links

- Bus Stop on Flickr - Photo Sharing!  2 days ago
- 30 Boxes | It's your life >> Blog Archive &...  3 days ago

No Soap, Radio!

- Life Without a Cell Phone  1 week ago
- 30 Boxes is Top Calender  2 weeks ago

**Quick*Step**

- 2007  2 weeks ago
- EOY  4 weeks ago
- 2006 Treasure Island  2 months ago

Latest photos from narendra at Webshots

- My Public Shoebox  2 months ago
- 15th  7 months ago
- Lean Horse Ultramarathon  a while ago
- Photoblog by Narendra  a while ago
- The Last Day  a while ago

MySpace: Narendra    +Add MySpace Friend

- Hello World!  a while ago

Flickr: narendra's Photos

- 30Boxes Supermail Message with Flickr Photo  3 days ago
- 30 Boxes Shared Links  3 days ago

Nick Wilder ☆   610 — Rated: 9

Boulder CO
12° - 29° Partly Cloudy

Last seen today. Web stuff updated January 27. Nick has 12 buddies.

Other ways to get in touch:

Nick's Home Page

Home Locale:

Nick W's upcoming events:

January 29: USTrust call
January 30: meet Cherie & Kate
January 30: casino royale
February 2: CNET payment
February 2: meet with Karla

Nick's Buddies:

Sharing / Privacy

Nick and I are trusted buddies and can see each other's contact info and web stuff.

I can see Nick's calender

I am sharing my calender with Nick. Change Sharing Options

My Notes

Boulder CO

Message Nick

Click to send a quick note to Nick by email or text message!

( Send Email )  ( Send SMS )

Nick's Web stuff:

Shared Links

- link to dailycamera.com  5 weeks ago
- Mountain Project: Climbing photo of Sunshine Slab > Tu... 6 weeks ago
- Yahoo!  7 weeks ago
- Webshots - Photo Sharing, Free Wallpaper and Free Screens... 7 weeks ago

Latest photos from nick at Webshots

- 10th Mt. Hut Trip, Jan 2007  2 days ago
- House Construction, Jan-Feb 2007  2 days ago
- Fall 2006  3 weeks ago
- House construction, Nov-Dec 2006  6 weeks ago
- Amalfi & Sardenia, Sep 2006  2 months ago

Nick & Megan's Adventures

- Tahoe Big Blue Adventure Race  a while ago

Flickr: nickwilder's Photos

- Sunny, 65 degrees, and no clouds  3 months ago
- From Red Rocks park  3 months ago
- (Untitled)  3 months ago
- Mack  3 months ago
- Foundation  3 months ago

FIGURE 6

Buddy Card

Phantom Buddy Card

PROFILE GENERATION, USE, AND MANAGEMENT

CROSS REFERENCE TO RELATED PATENT APPLICATIONS

This application claims priority to U.S. Provisional Application Ser. No. 60/888,073, entitled "Profile Generation, Use, and Management," filed Feb. 2, 2007, which application is incorporated herein by reference in its entirety.

BACKGROUND

A. Technical Field

The present invention pertains generally to profiles, and relates more particularly to systems and methods that allow for generating, using, and managing profiles.

B. Background of the Invention

Personalization on the Internet is considered a highly desirable state because it provides information to the website operator that may make a website user's experience richer and more relevant—which typically enables a longer-term relationship.

Historically, personalization has involved an individual registering with a website and providing information (such as name, address, preferences, etc.) to enable the website to tailor the service and the information to the individual.

With the rise of social networking websites and services, increasingly personalization includes the connections to individuals created elsewhere online as well as the profile information related to those individual connections. There is a significant benefit of connecting to individuals who have data associated with their profiles as well as a benefit of connecting to individuals who may not be authenticated users of the service.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

FIG. 4 illustrates an example of a phantom profile page provided by a service according to various embodiments of the invention.

FIGS. 5A and 5B illustrate an example of a true profile page provided by a service according to various embodiments of the invention.

FIG. 6 illustrates an example of a trusted buddy profile page provided by a service according to various embodiments of the invention.

DETAILED DESCRIPTION OF THE PREFERRED EMBODIMENTS

Figure 1:
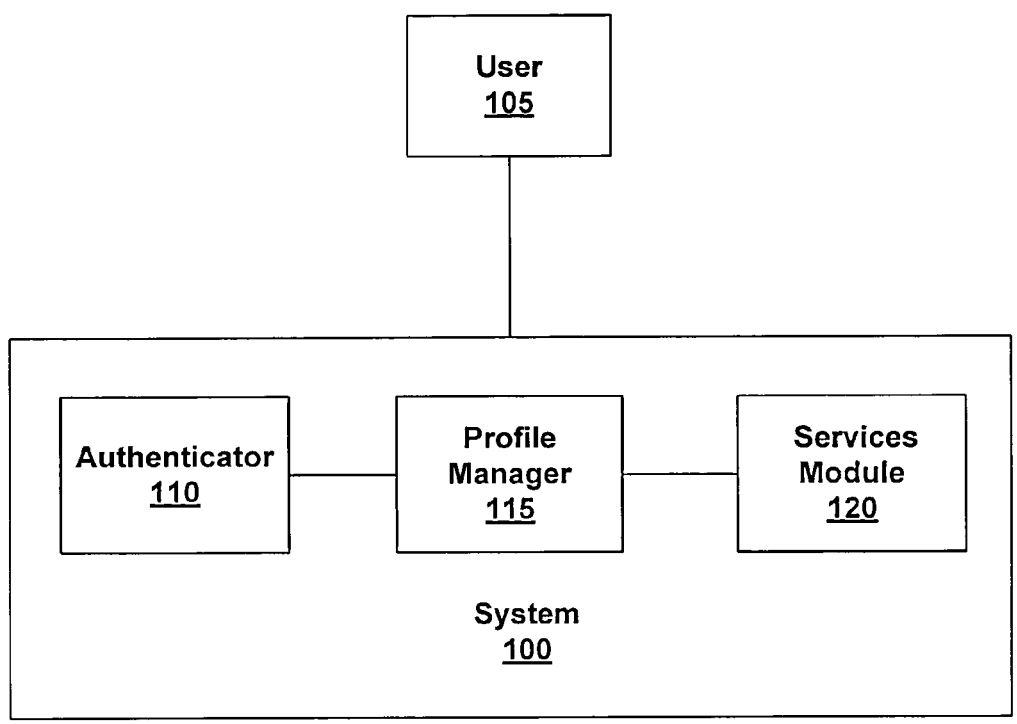
FIG. 1 depicts a block diagram of a service-providing system according to various embodiments of the invention.

Aspects of the present invention relate to systems and methods for generating and personalizing a profile, which may be a user account profile. In embodiments, a profile for a non-user or a non-authenticated user may be generated, which may be referred to herein as a "phantom profile." In embodiments, the phantom profile provides a means for creating and personalizing user accounts by appending data and metadata (hereinafter, collectively referred to as data) to a profile, as well as a means for sharing and improving (adding and editing data) these profiles—whether or not the user is an authenticated user of the services associated with the user account. Examples of data include but are not limited to text, animations, links and IDs to data on a website or other websites, summaries, photos, one or more unique identifiers, other content, and the like. It shall also be noted that for the purposes of this disclosure a non-authenticated user shall be construed to mean non-users, non-authenticated users, or both.

In the following description, for purpose of explanation, specific details are set forth in order to provide an understanding of the invention. It will be apparent, however, to one skilled in the art that the invention may be practiced without these details. One skilled in the art will recognize that embodiments of the present invention, some of which are described below, may be incorporated into a number of different systems and devices including general purpose computers, specialized computers, mobile devices (including without limitation mobile telephones, personal data assistants (PDAs), and multimedia devices), and the like. The embodiments of the present invention may be implemented in software, hardware, firmware, or combinations thereof. It shall be noted that the specific implementation is not critical to the present invention.

It shall be understood that devices or components (or modules), that may be shown in block diagrams are illustrative of embodiments of the invention and are meant to avoid obscuring the invention. It shall also be understood that throughout this discussion that systems, devices, or components may be described as separate functional units, which may comprise sub-units, but those skilled in the art will recognize that the various systems, devices, or components, or portions thereof, may be divided into separate systems, devices, or components or may be integrated together, including integrating within a single system, device, or component.

Furthermore, connections between devices, systems, and components are not intended to be limited to direct connections. Rather, data between these items may be modified, re-formatted, or otherwise changed by intermediary components. Also, additional or fewer connections may be used. It shall also be noted that the terms "coupled" or "communicatively coupled" shall be understood to include direct connections, indirect connections through one or more intermediary devices, and wireless connections.

Reference in the specification to "one embodiment" or "an embodiment" means that a particular feature, structure, characteristic, or function described in connection with the embodiment is included in at least one embodiment of the invention and may be in more than one embodiment. The appearances of the phrase "in one embodiment" or "in an embodiment" in various places in the specification are not necessarily all referring to the same embodiment.

The methods of the present invention may be embodied in an application, web service, or web site, which may be a calendaring application or multimedia application that involves one or more forms of media (photos, graphics, videos, texts, animations, hyperlinks, website, and the like). In one embodiment, the application may be an Internet application, wherein, through a web browser, a user may interact with one or more individuals or groups. In an embodiment, the application may allow a user to build a dynamic journal by adding content (e.g., calendar events, content or links to sites like flickr, myspace, webshots, livejournal (or any personal blog), etc.) so the user can track, record, and share updates in one convenient place. In embodiments, the individual may also add personal information, such as for example zip code, webcal/ical subscriptions to see other event calendars, etc. It shall be noted that neither specific implementation of the methods of the present invention nor the specific implementations of devices or systems that may be used to facilitate the method or methods is critical to the present invention.

As noted above, aspects of the present invention involve creating phantom profiles. A phantom profile enables the creation and personalization of a user account. A phantom profile also allows the sharing and improving a profile by adding and editing the contents of the profile, whether or not the user (that is, the entity associated with that profile) is an authenticated user of the service. Such systems and methods are distinct from traditional profile generation and management.

In traditional profile generation and management systems, an individual registers at a website and is prompted to complete a form with profile information to personalize the experience. In some traditional profile management methods, a stub profile may be used. A stub profile typically belongs to a non-user of a service. The stub profile allows for the creation of a placeholder user account based on an email address used to send an invitation initiated by an existing user. The invited individual typically will be given a registration form with some information pre-populated on it, such as an email address and first name, for the individual to complete in order to become a user of the service. A stub profile generally has no outward or public facing view. In both the traditional and stub variations, any social connections made within that website must typically be made to existing users of the site.

A. System Implementations

FIG. 1 depicts a service-providing system 100 (such as a social networking service or services) according to various embodiments of the invention. System 100 receives input from a user 105, and the system comprises an authenticator 110, a profile manager 115, and a services module 120.

Consider, by way of illustration and not limitation, the following example of system 100 according to embodiments of the invention. A user 105 registers with a service 100, such as the Internet service 30boxes.com, which provides calendaring, contacting, task management, and other services. The profile manager 115 may maintain a server or servers that stores profile information, which may include an entry in a user database that associates a user with one or more pieces of information, such as an email address. The services module 120 may provide "Contacts/Buddies/Friends" to a user 105, which may comprise a collection of one or more profiles tied by one or more database entries to the user. The services module 120 may also record and/or indicate a relationship between the user and each contact profile. In an embodiment, the services module 120 may provide an aggregate display of a user's profile data, which may be referred to herein as a "Buddy Page."

1. User Profiles

One aspect of the present invention is that a profile may be made for non-authenticated users and that profile may be populated with content and maintained by one or more third parties. In embodiments, an individual may register with a website to find an extensive personalized profile with only an authentication required for registration. Thus, social connections may be made to authenticated users of the website or to personalized, but not authenticated, individuals. A profile for an authenticated user of web services or a profile that has been verified or confirmed by the subject of the profile (or by an authorized agent) may be referred to herein as a "true profile" and the profile for a non-authenticated individual of the web services or non-verified/non-confirmed profile may be referred to herein as a "phantom profile." In an embodiment, a true profile may comprise an entry in a user table with personal data keyed to one or more authenticated unique identifiers (such as, email addresses), and a phantom profile may comprise an entry in a user table with personal data keyed to a unique identifier that has not been authenticated. In embodiments, authentication of unique identifiers may be performed by authenticator 110.

Figure 2:
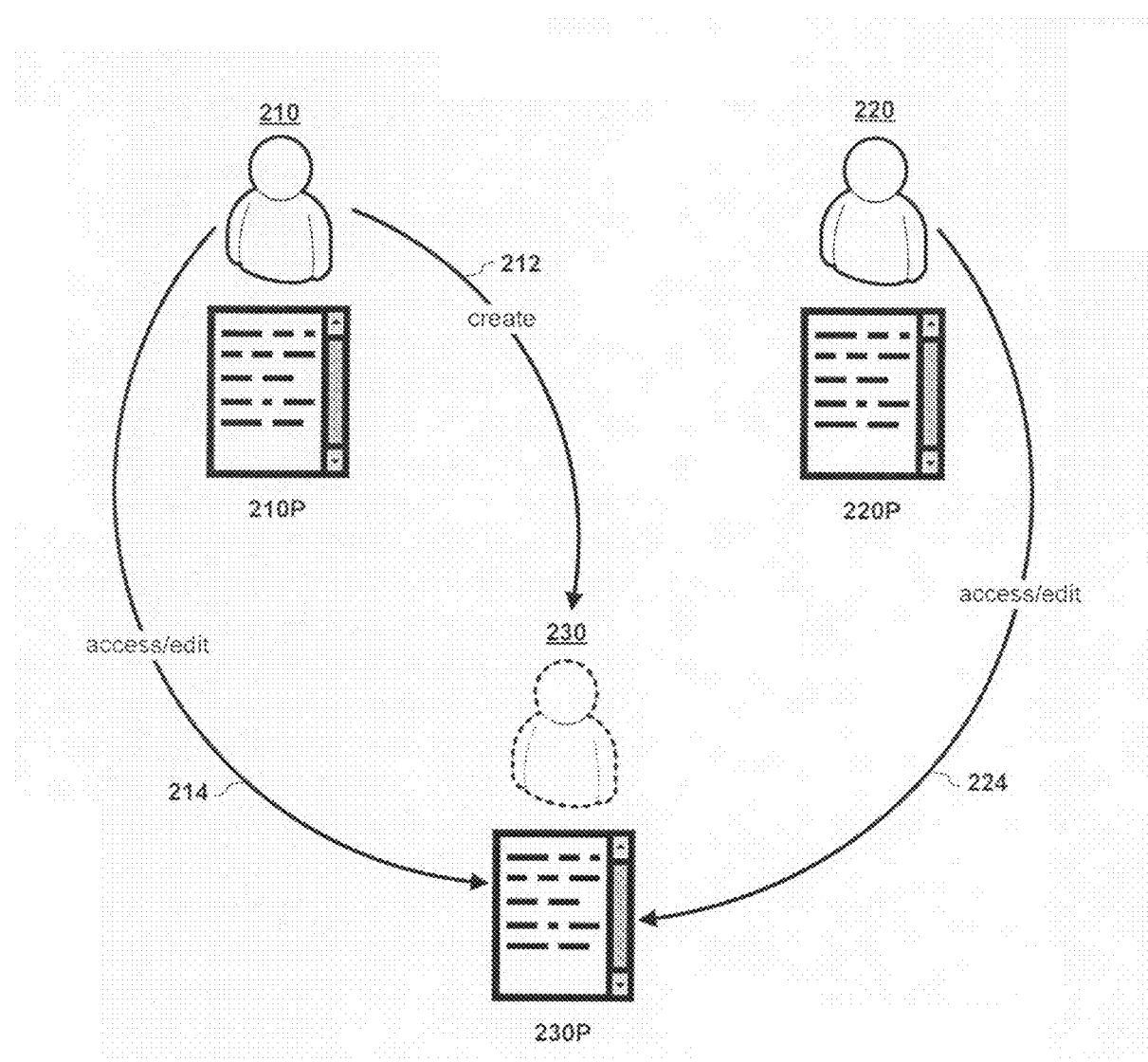
FIG. 2 illustrates an example of using a service to create a phantom user profile according to various embodiments of the invention.

FIG. 2 depicts an example of a service facilitating the creation and maintenance of a phantom profile according to various embodiments of the invention. A user of the service 210 may add a unique identifier (such as email address, instant message account name, phone number, etc.) for a non-authenticated user 230 as a contact in the contacts list within his or her profile 210P. In an embodiment, a profile 230P for user 230 may be created 212 by the service as a phantom profile. In an embodiment, the phantom profile may be personalized using open web discovery. In one embodiment, open web discovery may comprise gathering information related to the unique identifier by searching third party sources. For example, the email address of user 230 may be used to search blogs, posting sites (photo posting, video posting, etc.), web sites, and other places on the Internet to gather information associated with that email address. For instance, web sites (such as flickr.com, webshots.com, 360.yahoo.com, upcoming.org, and others) allow third parties to search for users by their email address. If a user is found, all or parts of that user's data may be retrieved and used.

In an embodiment, user 230 may have a profile 230P that may be considered "unlocked." An unlocked profile may be edited by one or more third parties, such as user 210. It shall be noted that user 210 has an interest in maintaining relevant profile information about user 230 and may amend and edit 214 information pertaining to user 230. In an embodiment, only certain individuals may be allowed to edit the profile, such as, for example, authenticated users or authenticated users with user 230 as a contact.

Consider, by way of further illustration, that user 220 is also registered with the service (e.g., registered user of 30boxes.com) and adds an identifier associated with user 230 (e.g., an email address) as a contact in the contacts list within his or her profile 220P. The phantom profile 230P for user 230 may then be made available to user 220. User 220 may amend and edit 224 information pertaining to user 230. It should be noted that because the phantom profile may be shared between users (214, 224), such an embodiment creates a collaborative effort whereby users benefit from the efforts performed by other users.

It should also be noted that non-authenticated users may also benefit from the personalization efforts of users. Consider, by way of illustration and not limitation, the following example. Assume that at some date in the future, the individual associated with an identifier associated with user 230 chooses to register with the service. In an embodiment, upon authentication, that individual may assume the account profile for user 230, which may already contain a great deal of content from the open web discovery and/or from other users, such as user 210 and user 220. In an embodiment, the phantom profile may be converted to a true profile.

Figure 3:
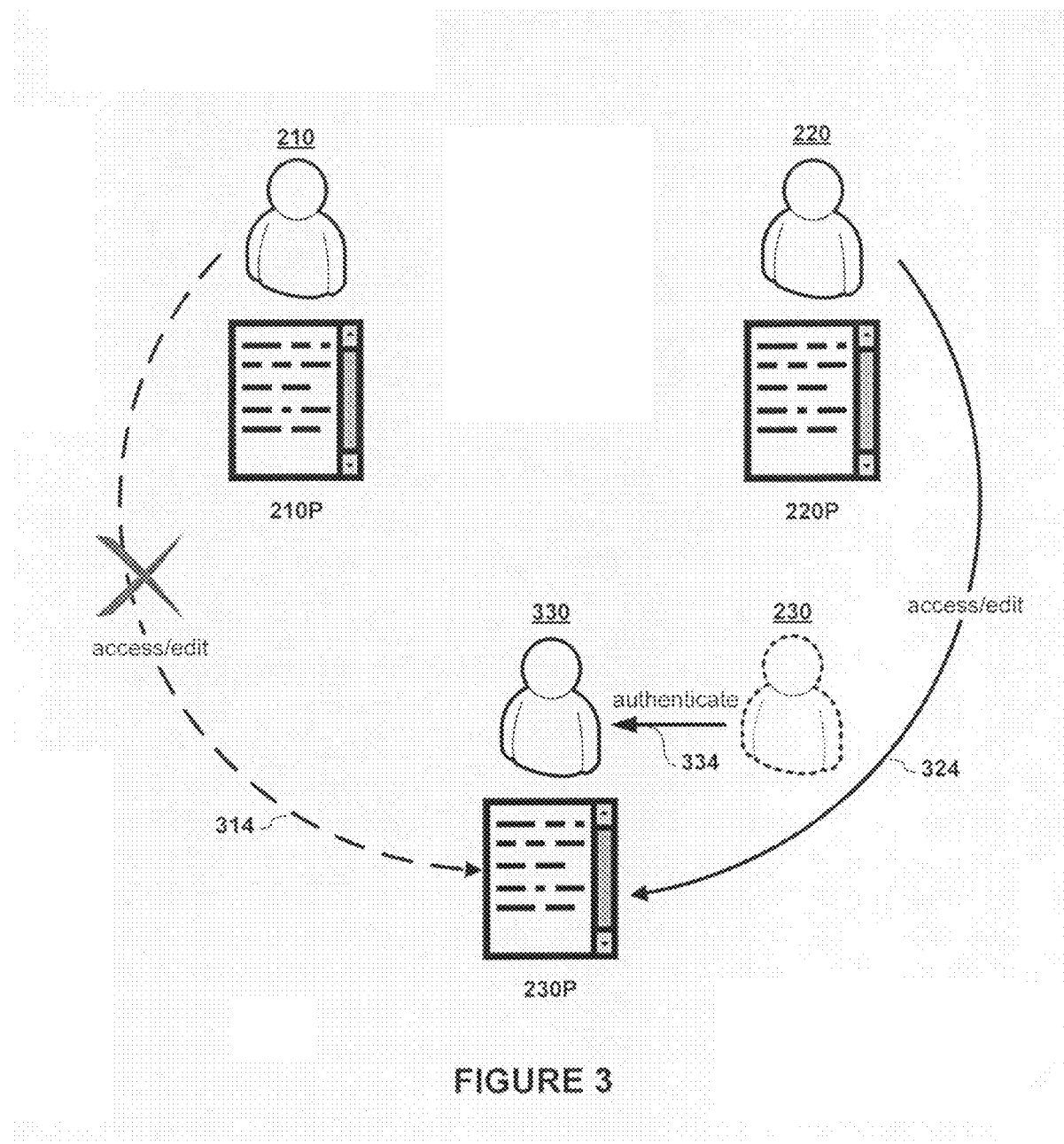
FIG. 3 illustrates an example of using a service to convert a phantom user profile to a true user profile according to various embodiments of the invention.

FIG. 3 depicts an example of the conversion of a phantom profile to a true profile according to embodiments of the invention. In an embodiment, once an individual is authenticated 334 and becomes an authenticated user 330, the profile 230P for user 330 may be locked. User 330 may have the option of deciding whether to keep the profile locked or to make it unlocked and available for edit 324 to other users, such as those users (user 220) who have user 330 as a contact. In embodiments, a profile may be locked for all users or unlocked for all users. In this example, user 210 has been blocked 314 from having certain rights to the profile 230P of user 330, such as edit rights and/or access rights.

It shall also be noted that aspects of the present invention may be applied in other embodiments as well. As noted above, one benefit of the present invention is that a user may register to obtain an account and find that a significant amount of information has already been entered. This advantage may be obtained in situations as the one illustrated in FIGS. 2 and 3 where a user, such as user 210, has initiated the creation of a phantom profile for a third party, user 230. However, a phantom profile could also be generated at the initiation of the intended recipient of the profile. For example, when an individual initially creates an account, open web discovery may be employed to populated fields or obtain profile content that may then be presented to the individual for acceptance, verification, and/or editing.

Accordingly, it should be noted that embodiments of the present invention may comprise a system that provides for the warehousing and maintenance of any number of phantom profiles that can be created by a variety of means. Examples of means for obtaining content for a phantom profile may include but are not limited to: signing up for a web service, including a non-authenticated user in the services (e.g., adding Contacts as part of the 30 Boxes service), commenting on 30 Boxes Buddy Card enabled blogs (which Buddy Card may be a system that can verify the authenticity of a blog commenter's email address, and associated name and "buddy page" on 30 Boxes), the act of searching on 30 Boxes People Search (which 30 Boxes People Search may comprise searching for a unique identifier on 30 Boxes and may cause the servers to use auto-discovery and collect all public information it can find about a user, even if they are not a user of 30 Boxes), the selection of an instant messenger contact (e.g., Yahoo! Messenger contacts), and any and all websites or services that make use of an application programming interface that facilitates searching or linking a user to a unique identifier (such as 30 Boxes' application programming interface (API) for user.FindByEmail, which allows third parties to obtain data and metdata about a user for a given email address).

In an embodiment, to generate the data used to personalize a phantom profile, services module 120 may perform a series of remote calls to websites in an effort to glean information. Examples of such sites include but are not limited to yahoo.com, flickr.com, webshots.com, myspace.com, upcoming.org, livejournal.com, and others. Sites such as these allow third parties to search for users, either by use of standard web pages or an API. If a user is found, data related to that user's account may be retrieved, through a standard web page or an API. Third parties may make calls to these web sites in order to obtain the most recent data about a user. In an embodiment, these calls may be made one or more times, including periodically. These calls may be made via web pages, API requests, RSS feeds, or other methods. In an embodiment, the data retrieved may be subject to text parsing and logic in order to assign relevant data to the user table for a phantom profile.

Depicted in FIG. 4 is an embodiment of a Buddy Page associated with a phantom profile, according to various embodiments of the invention. In an embodiment, a buddy page may be viewable to any users who have added as a contact an identifier associated with this profile (e.g., an email address). In an embodiment, an identifier (such as an email address) may not be required to see a buddy page, and they may be viewed or accessed as a result of searches (e.g., Google search), by clicking on a "Buddy Card" on someone's blog, or by publishing or sharing a link to a user's buddy page. FIG. 4 depicts data that may be associated with the phantom profile, including such information as first and last name, location, weather, home page, connections to other users based on social networks (420, 430), a rating based on social participation 410, as well as links and descriptions 440 of media produced or associated with this profile such as blog posts, photos, music recommendations, shared links, blog comments, etc.

2. Trusted Relationships

In an embodiment, all profiles may be associated with a unique identifier, such as an email address. True profiles may be those profiles which have been authenticated (e.g., by sending an email to the email address in the profile). In an embodiment, the email may include a special link that must be clicked or selected by the recipient of the email. Thus, in an embodiment, a difference between a phantom profile and a true profile may be that the phantom profile is built on an unauthenticated email. In an embodiment, a true profile may also contain additional email addresses or other unique identifiers keyed to that profile. One skilled in the art shall recognize that other mechanisms and/or contact means (SMS/Text messaging, instant messaging, etc.) may be used to validate a profile. In embodiments, authentication may be performed by or received from a third party, such as an affiliate service/site or other trusted service/site.

Figure 5A:

FIGS. 5A-5B and FIG. 6 depict embodiments of true profiles, which profiles may be depicted as publicly viewable Buddy Pages on the 30boxes.com website. In an embodiment, the true profile may be the same as that of a phantom profile, such as the one depicted in FIG. 4, and may include additional information such as links to other content (e.g., a home page 515), Contacts (e.g., buddies/friends/contacts) (520, 620) and other contacts 530, as well as web presence (540, 640). In embodiments, a service, such as 30 Boxes, and/or the profile may allow a user to build a dynamic journal by adding content items (e.g., flickr, myspace, webshots, livejournal or any personal blog, calendar events, comments, articles, videos, audio, etc.) so that the user can track, record, organize, catalog, and/or share the items (and updates) in one convenient place. Furthermore, a user may also add one or more calendar subscription to see other event calendars for the user and/or for third parties. In an embodiment, the true profile may give a distinction as part of a social rating of web presence (510, 610) that this profile is in fact a true profile and has been authenticated. In an embodiment, the distinction may be made by assigning a color, such as a green background, for a label, such as the rating label "Rated: 9," whereas phantom profiles may be assigned a different color for the label.

Another aspect of the present invention is that users may create trusted relationships. Users may create trusted relationships with other users who have true profiles or phantom profiles by entering a unique identifier associated with another user's profile. In embodiments, a trusted relationship between two users may be provided automatically by the service if both users have added each other as contacts. In embodiments, a trusted relationship may be imported from a third-party site/service. In an embodiment, trusted relationships enable users to add or amend protected personal data in each others' profiles.

In an embodiment, the results of an open web search may be used to indicate a social rating, trust level, or validity level of a profile. For example, search results that return a number of matches or links, thereby indicating a high degree of activity by the user on web sites, may be indication a meaningful or valid user/account. In embodiments, a user may assign different trust levels to a trusted relationship. A higher trust level may be associated with greater rights to a profile (e.g., amending or adding greater amounts of protected profile data). In embodiments, a trust level may be obtained from a third-party site/service.

FIG. 6 depicts an embodiment of a true profile Buddy Page (for Nick Wilder) as seen by a trusted user (e.g., Narendra Rocherolle) who has added an identifier associated with the true profile and has been granted access to certain protected information (such as, for example, address and schedule data). This profile may contain the same types of information described with respect to FIGS. 4 and 5A-5B as well as a description of the relationship between the person viewing the profile and the owner of the profile 650, a section of notes entered about the profile but which may only be visible to the individual who has added the notes (in this case, Narendra) 660, as well as email addresses, messaging interface 670, locale or address information, any shared schedule of events, and any other information.

3. Buddy Cards

In embodiments, Buddy Cards are small displays that contain a subset of either a profile or dynamically-created information as a result of an open web search (using one or more unique identifiers, such as an email address). In embodiments, a Buddy Card may be an application that may be displayed on websites outside of the website provided by the service 100, such as outside of the 30boxes.com website. That is, Buddy Cards represent a portable profile that may be embedded in other sites. The Buddy Card may be implanted as a plugin for use at a website, such as a WordPress plugin for a blog website.

In embodiments, when a person provides a unique identifier (e.g., his email address) when posting comments to a blog, he enables a plugin for the Buddy Card to poll a database of profiles (e.g., polls 30 Boxes website) to find a database match and display information found in that person's public profile page in the database. In embodiments, if no match is found in the database, the plugin will use open web searching to find publicly-available information related to the unique identifier, and this information will be displayed in a Buddy Card.

Figure 7:
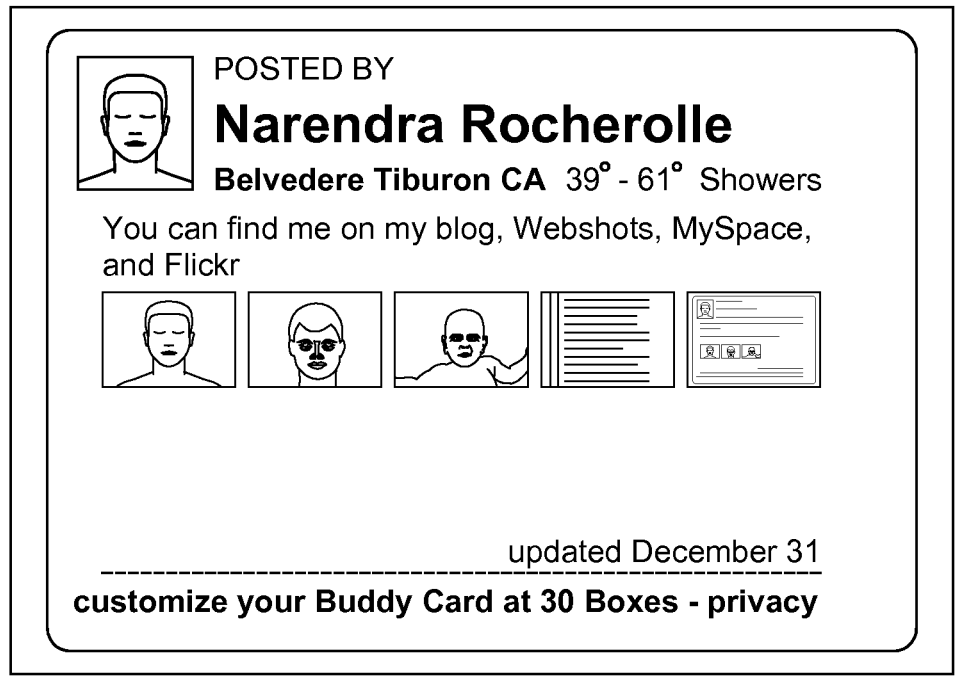
FIG. 7 illustrates an example of a true buddy card provided by a service according to various embodiments of the invention.
Figure 8:
FIG. 8 illustrates an example of a phantom buddy card provided by a service according to various embodiments of the invention.

In embodiments, if a database does not contain a profile, a phantom profile may be generated, and thus, a Buddy Card may act as a light form of registration with a service. It should also be noted that Buddy Cards can be associated with phantom or true profiles. FIG. 7 depicts an example of a Buddy Card representing a true profile, and FIG. 8 depicts an example of a Buddy Card representing a phantom profile, according to various embodiments of the invention. The Buddy Card may display profile data such as first and last name, location, weather, a summary of additional websites or networks associated with that profile, as well as a rating based on social participation and content published or associated with that profile. In embodiments, the content displayed on a Buddy Card may be customized by the user.

In embodiments, a Buddy Card may indicate whether it is associated with a true profile or a phantom profile, and a rating may also be displayed, which may be based on the web presence of the user associated with the Buddy Card or upon other factors. In an embodiment, the true/phantom indicator may be text or may be designated by assigning a color, such as a green background, for a label, such as the rating label.

Authentication of the user of a Buddy Card may optionally be required. In an embodiment, authentication may be done by requesting the user to supply an identifier, such as a password. It should be noted that authentication is not limited to authentication using identifiers supplied by individuals, and, in embodiments, authentication may be provided by third-party sites, cookies, or other authentication schemes such as OpenID, which is a framework for user identification that eliminates the requirement for multiple usernames across different websites.

B. Methods for Generating, Using, and Maintaining Profiles

Discussed above with respect to system implementations were also methods associated with the generation, use, and management of profiles. One aspect of the present invention is that a profile may be made for non-authenticated users and that profile may be populated with content and maintained by one or more third parties. In embodiments, an individual may register with a website to find an extensive personalized profile with only an authentication required for registration. Thus, social connections may be made to authenticated users of the website or to personalized, but not authenticated, individuals. A profile for an authenticated user of web services or a profile that has been verified or confirmed by the subject of the profile (or by an authorized agent) may be referred to herein as a "true profile" and the profile for a non-authenticated individual of the web services or non-verified/non-confirmed profile may be referred to herein as a "phantom profile." In an embodiment, a true profile may comprise an entry in a user table with personal data keyed to one or more authenticated unique identifiers (such as, email addresses), and a phantom profile may comprise an entry in a user table with personal data keyed to a unique identifier that has not been authenticated.

Figure 9:
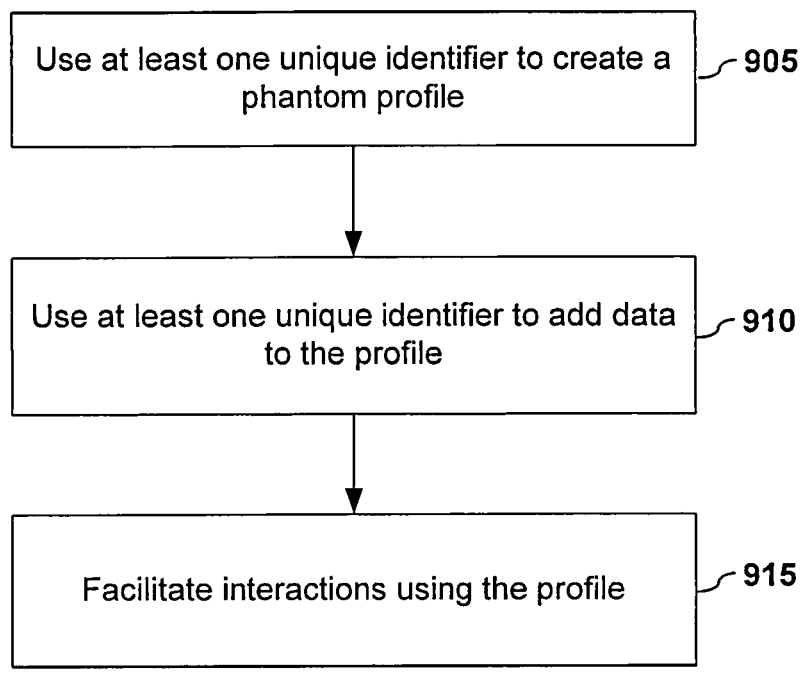
FIG. 9 depicts a method for creating a phantom user profile according to various embodiments of the invention.

FIG. 9 depicts a method 900 for creating a phantom user profile according to various embodiments of the invention. Method 900 may be implemented by embodiments of system 100.

A phantom profile entry in a user table may be created 905 when, for example, a user of the service adds a unique identifier (such as email address, instant message account name, phone number, etc.) for a non-authenticated user as a contact in his or her contacts in the service. A phantom profile may also be generated as a result of a Buddy Card being generated for a non-authenticated user of a service.

Examples of other ways the creation of a profiles may be triggered includes but are not limited to: signing up for a web service; including/interacting with a non-authenticated user in the services (e.g., adding Contacts as part of the 30 Boxes service); commenting on Buddy Card-enabled blogs (which Buddy Card may be a system that can verify the authenticity of a blog commenter's identifier, and associated name and profile page on a service), the act of searching on 30 Boxes People Search (which 30 Boxes People Search may comprise searching for a unique identifier on 30 Boxes and may cause the servers to use auto-discovery and collect all public information it can find about a user, even if they are not a user of 30 Boxes), the selection of an instant messenger contact (e.g., Yahoo! Messenger contacts), and any and all websites or services that make use of an application programming interface that facilitates searching or linking a user to a unique identifier (such as 30 Boxes' application programming interface (API) for user.FindByEmail, which allows third parties to obtain data about a user for a given email address).

The unique identifier may be used to add data to the profile. For example, the service may collect data for the phantom profile 910 by performing a series of calls to websites in an effort to glean information. Examples of such sites include but are not limited to yahoo.com, flickr.com, webshots.com, myspace.com, upcoming.org, livejournal.com, and others. Sites such as these allow third parties to search for users, either by use of standard web pages or an API. If a user is found, data related to that user's account may be retrieved, through a standard web page or an API. Third parties may make calls to these web sites in order to obtain the most recent data about a user. In an embodiment, these calls may be made one or more times, including periodically. These calls may be made via web pages, API requests, RSS feeds, or other methods. In an embodiment, the data retrieved may be subject to text parsing and logic in order to assign relevant data to the user table for a phantom profile.

For example, the email address of the non-authenticated user may be used to search blogs, posting sites (photo posting, video posting, etc.), web sites, and other places on the Internet to gather information associated with that email address. For instance, web sites (such as flickr.com, webshots.com, 360.yahoo.com, upcoming.org, and others) allow third parties to search for users by their email address.

The system may enable interaction with a phantom profile 915 in a variety of ways. For example, users of a service may collaboratively maintain a phantom profile by adding/editing data in the profile. In embodiments, a phantom profile is "unlocked" so that users may add to or amend the data in the phantom profile. In embodiments, a user of the service may form a trusted relationship with the phantom profile, enabling the user to add to or amend all of the data associated with the phantom profile. This collaboration of users also represents a mechanism for obtaining information for a phantom profile. The service may provide other interactions include allowing communicating message or other content. It should be noted that Buddy Cards represent another means of interaction with the profile, even for the non-user. One skilled in the art shall recognize that other uses, including other social interactions, may be facilitated given the profile.

C. Computing System Implementations

Aspects of the present invention may be implemented in any device or system capable of processing data, including without limitation, a general purpose computer and an implementation-specific computer. The present invention may also be implemented into other devices and systems, including without limitation, any device or group of devices that are capable of processing and/or displaying data. Furthermore, within any of the devices, aspects of the present invention may be implemented in a wide variety of ways including software, hardware, firmware, or combinations thereof. For example, the functions to practice various aspects of the present invention may be performed by components that are implemented in a wide variety of ways including discrete logic components, one or more application specific integrated circuits (ASICs), and/or program-controlled processors. It shall be noted that the manner in which these items are implemented is not critical to the present invention.

It shall be noted that the present invention may be implemented in any instruction-execution/computing device or system capable of processing data, including without limitation, a general-purpose computer and a specific computer, such as one intended for data processing. The present invention may also be implemented into other computing devices and systems. Furthermore, aspects of the present invention may be implemented in a wide variety of ways including software, hardware, firmware, or combinations thereof. For example, the functions to practice various aspects of the present invention may be performed by components that are implemented in a wide variety of ways including discrete logic components, one or more application specific integrated circuits (ASICs), and/or program-controlled processors. It shall be noted that the manner in which these items are implemented is not critical to the present invention.

Figure 10:
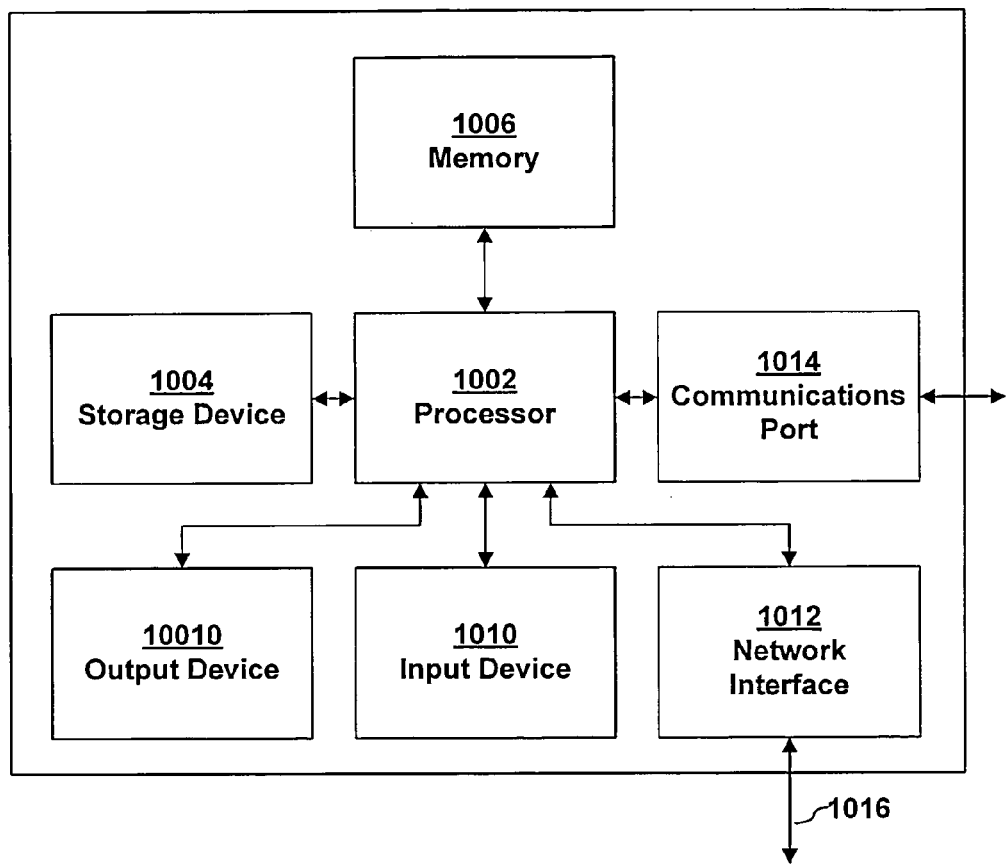
FIG. 10 depicts a block diagram of a computing system according to various embodiments of the invention.

FIG. 10 depicts a functional block diagram of an embodiment of an instruction-execution/computing device 1000 that may implement or embody embodiments of the present invention. As illustrated in FIG. 10, a processor 1002 executes software instructions and interacts with other system components. In an embodiment, processor 1002 may be a general purpose processor such as an AMD processor, an INTEL x86 processor, a SUN MICROSYSTEMS SPARC, or a POWERPC compatible-CPU, or the processor may be an application specific processor or processors. A storage device 1004, coupled to processor 1002, provides long-term storage of data and software programs. Storage device 1004 may be a hard disk drive and/or another device capable of storing data, such as a computer-readable media (e.g., diskettes, tapes, compact disk, DVD, and the like) drive or a solid-state memory device. Storage device 1004 may hold programs, instructions, and/or data for use with processor 1002. In an embodiment, programs or instructions stored on or loaded from storage device 1004 may be loaded into memory 1006 and executed by processor 1002. In an embodiment, storage device 1004 holds programs or instructions for implementing an operating system on processor 1002. In one embodiment, possible operating systems include, but are not limited to, UNIX, AIX, LINUX, Microsoft Windows, and the Apple MAC OS. In embodiments, the operating system executes on, and controls the operation of, the computing system 1000.

An addressable memory 1006, coupled to processor 1002, may be used to store data and software instructions to be executed by processor 1002. Memory 1006 may be, for example, firmware, read only memory (ROM), flash memory, non-volatile random access memory (NVRAM), random access memory (RAM), or any combination thereof. In one embodiment, memory 1006 stores a number of software objects, otherwise known as services, utilities, components, or modules. One skilled in the art will also recognize that storage 1004 and memory 1006 may be the same items and function in both capacities. In an embodiment, one or more of the components of FIG. 1 may be modules stored in memory 1004, 1006 and executed by processor 1002.

In an embodiment, computing system 1000 provides the ability to communicate with other devices, other networks, or both. Computing system 1000 may include one or more network interfaces or adapters 1012, 1014 to communicatively couple computing system 1000 to other networks and devices. For example, computing system 1000 may include a network interface 1012, a communications port 1014, or both, each of which are communicatively coupled to processor 1002, and which may be used to couple computing system 1000 to other computer systems, networks, and devices.

In an embodiment, computing system 1000 may include one or more output devices 1008, coupled to processor 1002, to facilitate displaying graphics and text. Output devices 1008 may include, but are not limited to, a display, LCD screen, CRT monitor, printer, touch screen, or other device for displaying information. Computing system 1000 may also include a graphics adapter (not shown) to assist in displaying information or images on output device 1008.

One or more input devices 1010, coupled to processor 1002, may be used to facilitate user input. Input device 1010 may include, but are not limited to, a pointing device, such as a mouse, trackball, or touchpad, and may also include a keyboard or keypad to input data or instructions into computing system 1000.

In an embodiment, computing system 1000 may receive input, whether through communications port 1014, network interface 1012, stored data in memory 1004/1006, or through an input device 1010, from a scanner, copier, facsimile machine, or other computing device.

One skilled in the art will recognize no computing system is critical to the practice of the present invention. One skilled in the art will also recognize that a number of the elements described above may be physically and/or functionally separated into sub-modules or combined together.

It shall be noted that embodiments of the present invention may further relate to computer products with a computer-readable medium that have computer code thereon for performing various computer-implemented operations. The media and computer code may be those specially designed and constructed for the purposes of the present invention, or they may be of the kind known or available to those having skill in the relevant arts. Examples of computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter.

While the invention is susceptible to various modifications and alternative forms, specific examples thereof have been shown in the drawings and are herein described in detail. It should be understood, however, that the invention is not to be limited to the particular forms disclosed, but to the contrary, the invention is to cover all modifications, equivalents, and alternatives falling within the scope of the appended claims.

What is claimed is:

1. A method for facilitating a service, the method comprising:
    creating, using at least one computing device, a user account for a first entity that is a non-user or a non-authenticated user of the service, the user account comprising a phantom user profile associated with the first entity that is a non-user or a non-authenticated user of the service by using at least one piece of profile-related data that identifies the first entity and the at least one piece of profile-related data being supplied by a second entity;
    enabling a plurality of users of the service to collaboratively maintain a set of profile-related data in the phantom user profile by allowing the plurality of users viewing and editing privileges for the set of profile-related data in the phantom user profile; and
    responsive to the first entity becoming a user of the service, converting the phantom user profile to a true user profile associated with the first entity by using at least some of the data contained in the phantom user profile.

2. The method of claim 1 further comprising the step of adding data to the phantom user profile by using the at least one piece of profile-related data.

3. The method of claim 2 wherein the step of adding data to the phantom user profile by using the at least one piece of profile-related data comprises:
    querying at least one third-party data source using the at least one piece of profile-related data that identifies the first entity; and
    responsive to data being returned from querying the at least one third-party data source, adding the data to the phantom user profile.

4. The method of claim 1 wherein enabling a plurality of users of the service to collaboratively maintain data in the phantom user profile comprises allowing the plurality of users to access and modify data in the phantom user profile.

5. The method of claim 1 further comprising the step of enabling at least one user of the service to form an interaction using the phantom user profile.

6. The method of claim 1 wherein becoming a user of the service further comprises authenticating the identity of the first entity.

7. The method of claim 1 wherein the first entity can select other users' rights associated with the first entity's true user profile.

8. The method of claim 1 wherein the first entity and a user of the service form a trusted relationship which allows additional rights to each other's true profile.

9. The method of claim 1 wherein a confidence rating is associated with the phantom user profile, the confidence rating being based on the data in the phantom user profile.

10. A non-transitory computer readable medium comprising one or more sequences of instructions which, when executed by one or more processors, causes the method of claim 1 to be performed.

11. A method for facilitating a social networking service, the method comprising:
    creating, using at least one computing device, a user account for a first entity that is a non-user or a non-authenticated user of the social networking service, the user account comprising a phantom user profile associated with the first entity that is a non-user or a non-authenticated user of the social networking service by using at least one piece of information that identifies the first entity;
    making the phantom user profile viewable to a plurality of users of the service;
    enabling a plurality of users of the service to collaboratively maintain data in the phantom user profile; and
    responsive to the first entity becoming a user of the service, converting the phantom user profile to a true user profile associated with the first entity by using at least some of the data contained in the phantom user profile.

12. The method of claim 11 wherein collaboratively maintaining data comprises sharing a set of data.

13. The method of claim 11 wherein the first entity and a user of the service form a trusted relationship which allows additional rights to each other's true profile.

14. The method of claim 11 further comprising:
creating a buddy card comprising a subset of user profile data associated with a user profile maintained by the service; and
creating a link on the buddy card that enables a plurality of users to access the user profile.

15. The method of claim 14 further creating a buddy card associated with an entity who is not associated with a user profile by:
creating a phantom user profile associated with the entity by using at least one piece of information that identifies the entity; and
creating the buddy card as a phantom buddy card associated with the phantom user profile.

16. The method of claim 11 wherein the first entity can select other users' rights associated with a buddy card that is associated with the true user profile.

17. A non-transitory computer readable medium comprising one or more sequences of instructions which, when executed by one or more processors, causes the method of claim 11 to be performed.

18. A system comprising:
one or more processors; and
one or more memories that are communicatively coupled to the one or more processors and store one or more sequences of instructions, wherein execution of the one or more sequences of instructions by at least one of the one or more processors causes steps to be performed comprising:
creating a user account for a first entity that is a non-user or a non-authenticated user of the social networking service, the user account comprising a phantom user profile associated with the first entity that is a non-user or a non-authenticated user of the social networking service by using at least one piece of information that identifies the first entity;
enabling a plurality of users of the service to collaboratively maintain data in the phantom user profile; and
responsive to the first entity becoming a user of the service, converting the phantom user profile to a user profile associated with the first entity by using at least some of the data contained in the phantom user profile.

19. The system of claim 18 wherein collaboratively maintaining data comprises sharing a set of data.

20. The system of claim 18 wherein enabling a plurality of users of the service to collaboratively maintain data in the phantom user profile comprises allowing the plurality of users to access and modify data in the phantom user profile.

21. The system of claim 18 wherein the one or more memories further comprise one or more sequences of instructions, wherein execution of the one or more sequences of instructions by at least one of the one or more processors causes steps to be performed comprising:
enabling at least one user of the service to form an interaction using the phantom user profile prior to the first entity becoming a user of the service.

22. The system of claim 18 wherein becoming a user of the service further comprises authenticating the identity of the first entity.

23. The system of claim 18 wherein the one or more memories further comprise one or more sequences of instructions, wherein execution of the one or more sequences of instructions by at least one of the one or more processors causes steps to be performed comprising:
enabling the first entity to select other users' rights associated with the first entity's user profile.

24. The system of claim 18 wherein the one or more memories further comprise one or more sequences of instructions, wherein execution of the one or more sequences of instructions by at least one of the one or more processors causes steps to be performed comprising:
enabling the first entity and a user of the service to form a trusted relationship which allows additional rights to each other's profile.

\* \* \* \* \*